(12) United States Patent  
Hurt et al.

(10) Patent No.: US 7,668,461 B2
(45) Date of Patent: Feb. 23, 2010

(54) METHOD FOR OPTIMIZING THE OPTICAL POWER IN AN OPTICAL NETWORK AND AN OPTICAL NETWORK

(75) Inventors: Hans Hurt, Regensburg (DE); Thomas Lichtenegger, Alteglofsheim (DE); Jörg Meier, Nürnberg (DE); Markus Wirsing, Regensburg (DE)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 623 days.

(21) Appl. No.: 11/232,181

(22) Filed: Sep. 21, 2005

(65) Prior Publication Data

US 2006/0110159 A1 May 25, 2006

(30) Foreign Application Priority Data

Sep. 24, 2004 (EP) .................................. 04090375

(51) Int. Cl.
*H04J 14/08* (2006.01)
(52) U.S. Cl. ........................ 398/98; 398/162; 398/197
(58) Field of Classification Search .................. 398/162, 398/197, 98
See application file for complete search history.

(56) References Cited

U.S. PATENT DOCUMENTS 6,480,308 B1* 11/2002 Yoshida et al. ................. 398/16
2002/0064131 A1* 5/2002 Boesinger et al. ........... 370/248
2003/0076569 A1* 4/2003 Stevens ...................... 359/187
2005/0019041 A1* 1/2005 Ensslin et al. ............... 398/202

FOREIGN PATENT DOCUMENTS

| EP | 0 331 255 A2 | 9/1989 |
| EP | 0 527 279 A1 | 2/1993 |
| WO | WO 02/067480 A1 | 8/2002 |

OTHER PUBLICATIONS

Weik, Martin H. "attenuation", "diagnostic", "path attenuation". Fiber Optics Standard Dictionary. 3rd ed. 1997.*

* cited by examiner

*Primary Examiner*—Leslie Pascal

(57) ABSTRACT

The invention relates to a method for optimizing the optical power in an optical network that has a plurality of network nodes each having a transmitter and a receiver. The method comprising generating an optical signal at a first network node, receiving the optical signal at a second network node, detecting the optical power of the optical signal at the second network node, determining whether the optical power detected is outside a defined range, and in this case, generating, for the first network node, a control signal for increasing or decreasing the optical power, sending the control signal to the first network node, and increasing or decreasing the optical power of the optical signal emitted at the first network node. The invention further relates to an optical network having network nodes which are operable to implement this method.

31 Claims, 3 Drawing Sheets

METHOD FOR OPTIMIZING THE OPTICAL POWER IN AN OPTICAL NETWORK AND AN OPTICAL NETWORK

REFERENCE TO RELATED APPLICATION

This application claims the benefit of the priority date of European patent application 04 090 375.9, filed on Sep. 24, 2004, the contents of which is herein incorporated by reference in its entirety.

FIELD OF INVENTION

The invention relates to a method for optimizing the optical power in an optical network that has a plurality of network nodes each having a transmitter and a receiver, and to a corresponding optical network.

BACKGROUND OF THE INVENTION

It is a known practice to transmit data using an optical network. An optical network has a plurality of network nodes which are arranged in accordance with a particular topology, for example a ring topology and a star topology. The individual network nodes each have a transmitter and a receiver. The receiver converts the optical signal emitted by another network node into an electrical signal. An intelligent unit in the network node evaluates the electrical signal and checks, in particular, whether the information contained in the signal is intended for its own network node or is to be forwarded. In the latter case, the electrical signal is converted into an optical signal again by the transmitter and is sent to a further network node.

The serial communications system MOST (Media Oriented System Transport) has become established in recent years for transmitting audio, video, voice and control data using optical waveguides in multimedia networks and, in particular, in the automotive sector. MOST technology has, in the meantime, become the standard for present and future requirements in multimedia networking in motor vehicles. A MOST system provides a bandwidth of up to 24.8 Mbit/s. The network topology in MOST systems is generally a ring topology or a bus topology.

The optical power in an optical network is determined by the optical power levels emitted by the individual optical transmitters of the network nodes. In this case, the optical power is selected in such a manner that, taking into account the path attenuation between a transmitter under consideration and the associated receiver, the optical power detected at the receiver is high enough for reliable signal detection.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a method for optimizing the optical power in an optical network and also for providing a suitable optical network wherein this goal may be achieved.

Accordingly, the present invention comprises initially receiving and detecting the optical power of the optical signal at a network node. Then, it is determined whether the optical power is within or outside a defined range. If the optical power is outside the defined range, a control signal for either increasing or decreasing the optical power is generated for that network node which emitted the optical signal. The control signal is sent to the emitting network node and the latter then increases or decreases the optical power of the emitted optical signal in accordance with the control signal received. The method may be repeated within a regulating operation until the optical power detected at the second network node is within the defined range.

The method of the present invention makes it possible, during operation, to set the optical power emitted by an optical transmitter of a network node to a suitable value as a function of the path attenuation between the transmitter and the associated receiver, thereby optimizing the optical power in the optical network. In this case, the invention ensures, on the one hand, that the signal received by the receiver is large enough to enable reliable signal detection. On the other hand, inefficient operation and an "overload" in the receiver in the case of excessively high optical power levels are prevented.

The optical power that is available to a receiver is dependent on various influencing parameters. Examples of such influencing parameters are, for example, the length and attenuation of the optical fiber through which the light is transmitted, the ambient temperature, ageing processes in the optical fiber and the transmitter, production-dictated discrepancies and any optical coupling that may possibly occur. Despite this variety of parameters which influence the path attenuation between a transmitter and a receiver, the method according to the invention makes it possible to always set that ideal optical power at the transmitter which leads to an optical power level in the receiver that is within a desired ideal range.

In particular, partial failure of the optical system, which may occur when the optical power in the receiver is no longer sufficient for signal detection because of high path attenuation, is also reliably prevented. The possibility of reducing the optical power of the transmitter in the case of low path attenuation also increases the lifetime of the optical transmitter and thus the overall reliability of the component. This is highly advantageous, in particular, in semiconductor lasers, for example in vertically emitting laser diodes (VCSELs).

The optical power of the respective transmitters of the network nodes of the optical network is naturally dependent on the path attenuation of the light transmission path between a respective transmitter and receiver. The optical power levels (which have been set) of the transmitters and the optical power levels detected at the receivers thus reflect the path attenuation between a respective transmitter and receiver. Accordingly, another advantage of the present invention is that the path attenuation on the individual paths of the optical network and changes in the path attenuation may be detected using the optical power levels which have been set and detected and may be used to diagnose the optical network.

The method according to the invention thus also improves the ability to diagnose the optical network, implemented, for example, by storing changes in the attenuation of particular paths in a central memory for retrieval and evaluation using an evaluation system. In another aspect of the invention, it is also possible to define suitable interfaces which can be used to detect the information relating to the respective path attenuations. These improved diagnosis capabilities may be implemented solely on the basis of software, that is to say without additional hardware.

It shall be pointed out that, within the scope of the present invention, the term "optical signal" is a synonym for an optical data signal, that is to say denotes an optical signal that has been modulated in accordance with data to be transmitted. In this case, the data to be transmitted may comprise both control or signaling data and user data.

In one exemplary implementation of the invention, the control signal is transmitted to the first network node via the optical network. The optical network itself thus serves for control signal transmission and feedback to the transmitter of the emitting network node. In principle, however, it is likewise conceivable for the control signals to be sent to the emitting network node via other connections, for example via a local area network and/or the Internet or via a radio link.

In another exemplary implementation, provision is made for signal transmission in the optical network to be subject to a transmission protocol that defines at least one user channel for transmitting user data and at least one control channel for transmitting control and signaling data. In this example, the control signal in the control channel is transmitted to the first network node. The control channel of the optical network thus serves to transmit the control signals.

In particular, provision may be made for the receiver of the second network node to be used to convert the received optical signal into an electrical signal, then, if the optical power detected is outside the defined range, for an electronic module to add the control signal to the electrical signal, and for the electrical signal that has been changed in this manner to be supplied to the transmitter of the second network node and converted into an optical signal. In this case, the electronic module may be arranged in the network node itself or may alternatively be assigned to a network management unit that communicates with the network node electrically.

It shall be pointed out that a control signal is generated irrespective of whether the signals received at the second network node are intended for the second network node or are forwarded to another network node. Thus, respective control signals each relate to the setting of the optical power in a transmission section of the optical network, irrespective of the contents of the transmitted data and their destination.

In one exemplary implementation, the optical power at the second network node is detected by measuring the photodiode current after the optical signal has been converted into an electrical signal. This makes it possible to easily and effectively determine the optical power that has been detected.

The optical network, in one exemplary configuration comprises a serial network in which optical signals are transmitted between adjacent network nodes. In particular, the network has a ring topology and/or a unidirectional network. In principle, however, other network topologies, for example a star topology or a bus topology, may also be implemented. The optical network may also be a bidirectional network.

Further, provision may be made for the control signal generated by the second network node to contain the address of the first network node in the optical network as the destination address. Of course, this is important when the generated control signal passes through a plurality of network nodes on its way to the destination node (e.g., the node that emitted the optical signal).

The destination address, in another exemplary implementation, may be specified without any problems when the transmitter contains its own address as sender information. This is because this sender information can then be given as the destination address. However, this is not always the case. In the case of unidirectional networks, provision may be made for the address of that network node which precedes the second network node in the unidirectional network to be given as the address of the first network node (that is to say as the address of the destination node for the control signal). The network nodes are numbered consecutively and each network node (n, $1 \leq n \leq N$) knows that it receives optical signals from a particular preceding network node (n−1).

In still another exemplary implementation, provision is made for the first network node to increase or decrease the optical power by a defined amount after it has received the control signal. The optical power is thus raised or lowered in a stepwise manner until a suitable value exists. Alternatively, the control signal may specify a particular percentage or value by which the optical power is raised or lowered. This would reduce the number of control loops.

In one advantageous embodiment, the optical power levels detected at the individual receivers of the network nodes and/or values derived therefrom (for example attenuation values) are stored in a memory. In this case, the attenuation of the individual transmission paths of the network is determined from the instantaneous optical power levels, for example, on the basis of the data contained in such a memory. The attenuation of the individual transmission paths of the network may be evaluated, for example, as part of a network diagnosis.

The optical network according to the invention has at least one network node having a means for detecting the optical power of an optical signal that was emitted by another network node. The optical network also has a means for determining whether the optical power detected is outside a defined range, and a means for generating, for that network node which emitted the optical signal, a control signal for increasing or decreasing the optical power if the optical power detected is outside the defined range. The optical network further comprises a means for sending the control signal to that network node which emitted the optical signal.

The optical network also has at least one network node having means for increasing or decreasing the optical power of the emitted optical signal as a function of corresponding control signals.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail below using an exemplary embodiment with reference to the figures, in which.

DETAILED DESCRIPTION OF THE INVENTION

Figure 1:
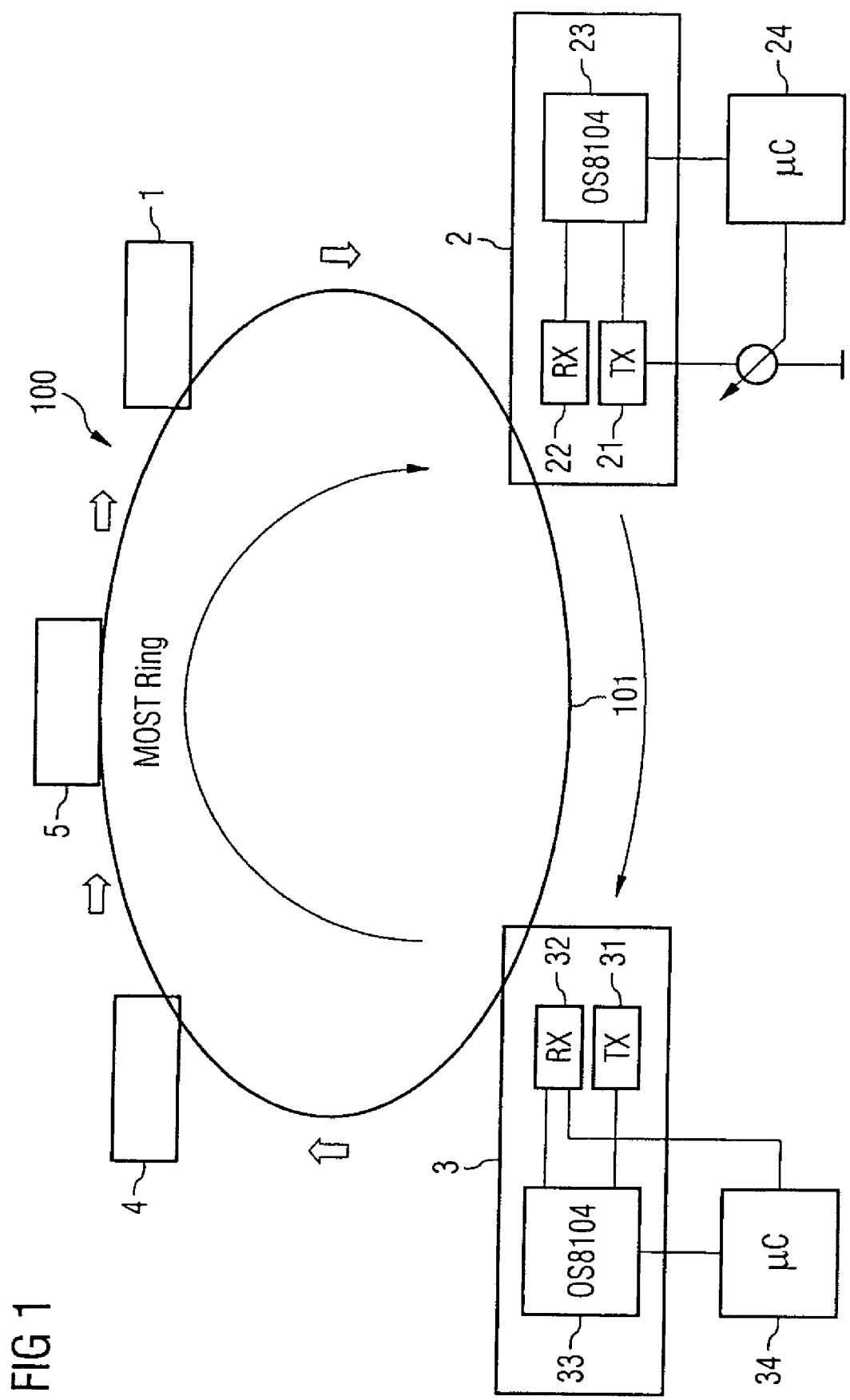
FIG. 1 is diagram of an exemplary optical MOST network in which the optical power of the individual transmitters is regulated as a function of the path attenuation between the individual network nodes.

FIG. 1 shows, as an example of an optical network, a unidirectional network having a ring topology. The exemplary embodiment illustrated in FIG. 1 is a MOST ring 100. The MOST ring 100 has a plurality of MOST devices 1-5 as network nodes. Each MOST device 1-5 is a physical unit that has at least one MOST transceiver having a transmitter TX and a receiver RX.

This is illustrated in detail for two MOST devices 2, and 3. The MOST device 2 has a transmitter 21, a receiver 22 and a first electronic module 23. Another electronic module which is furthermore provided and forms a microcontroller 24, may likewise be included in the MOST device 2 or alternatively may be located externally. The microcontroller 24 controls the transmitter 21 and, in particular, sets the optical power of the latter. Further, the MOST device 3 and also the additional MOST components 1, 4, 5 have corresponding components 31, 32, 33, 34 which are not shown in any more detail for the sake of brevity, in the case of the additional MOST components 1, 4, 5.

At the application level, the individual MOST devices 1 to 5 may have a plurality of components which are referred to as functional blocks representing, for example, a CD player or a telephone. They are known, as such, to persons skilled in the art and are not discussed in any further detail below.

Signals are transmitted in the MOST ring 100 in the following manner. If it is desired, for example, to send a message from the MOST device 2 to the MOST device 5, this message is first of all sent, by way of the serial structure of the ring, to the device 3, from the latter to the device 4 and from the device 4 to the device 5. In this case, the signal intended for the device 5 is transmitted by the transmitter 22 in the form of an optical signal and is passed onto the ring 100. The emitted signal is detected by the adjacent MOST device 3, to be precise by its receiver 32, or converted into an electrical signal. The microcontroller 34 uses signaling information such as the destination address and the message type to check whether the received data are intended for its own node. Since this is not the case in the exemplary embodiment described, the data are passed without any changes, but if appropriate after signal regeneration, to the transmitter 31 and emitted by the latter in the form of an optical signal.

The device 4 performs corresponding optical-electrical-optical conversion. The device 5 then detects that the data which have been sent are intended for the device 5 and the data are taken from the ring. An acknowledgement message is used to inform the device 2 (as the transmitting node) of the receipt so that the latter knows that the emitted data have been reliably received.

To avoid a problem, the optical power received by a receiving node or a receiver 32 should be within a particular range. For example, while the optical power received should be high enough to enable reliable signal detection, it should also not be high enough to avoid an overload. An excessively high optical power in the receiver also reflects an unnecessarily high optical power in the transmitter, which leads to increased power consumption and accelerated ageing of the transmitter. A defined range within which the optical power received by a receiver of a node 1, 2, 3, 4, and 5 should be, is thus established. Optical power management, which ensures that the received optical power is always in the defined range is described, with reference to exemplary FIG. 1, wherein an optical signal is sent from the MOST device 2 to the MOST device 3.

The optical signal emitted by the transmitter 21 of the MOST device 2 (also referred to below as the transmitting node 2) is transmitted to the receiver 32 of the MOST device 3 (also referred to below as the receiving node 3) via an optical point-to-point transmission path 101 of the MOST ring 100 of FIG. 1. The receiver 32 comprises, for example, a conventional photodiode. Means which determine the received optical power at the receiver 32 are provided in the receiving node 3. These means are, for example, integrated in the module 33 that additionally performs preamplification.

The optical power, in one example, is determined by directly measuring the photodiode current of the receiver 32. In this case, the photodiode current of the receiver 32 is filtered using a low-pass filter, for example. The current that is then present represents a measure of the input optical power and may be converted into a root-mean-square value of the input optical power using a calibration curve.

A check is then, for example, likewise carried out in the module 33 of the receiving node 3 to determine whether the received optical power determined is in the predetermined defined range. If this is not the case, the receiving node 3 forwards the corresponding information to the microcontroller 34, for example. In this case, the microcontroller 34 may be arranged outside the receiving node 3 or alternatively may also be integrated in the latter. Provision may also be made for the microcontroller 34, rather than the module 33, to check whether the optical power received is or is not in the defined range. Furthermore, it is also conceivable, in principle, for the microcontroller 34 to constitute a central microcontroller of the MOST ring 100 rather than being specifically assigned to the receiving node 3. In the former case, a central unit or a network management unit would thus check whether the optical power received is within the desired defined range.

If the optical power received is not within the desired defined range, the microcontroller 34 or a central network management unit generates, for the transmitting node 2, a control signal for increasing or decreasing the optical power as a function of whether the optical power received is too low or too high. This control signal is preferably passed onto the control channel of the MOST ring. To this end, the control data of the received optical signal that has been converted into an electrical signal by the receiver 32 are correspondingly overwritten. This is effected, for example, by the microcontroller 34 or additional electronic modules (not illustrated).

A corresponding signal whose control data have been changed is then passed onto the ring 100 in the form of an optical signal by the transmitter 31 and forwarded to the device 4.

In this case, the control signal that has been generated comprises, as the destination address of the control signal, the address of the device 2 so that the latter may detect that the control signal is intended for the device 2. Because the serial ring structure is unidirectional, the device 3 may, in this case, simply give the destination address as the device number of the node that is arranged upstream of it in the unidirectional MOST ring 100. If, for example, the individual MOST devices have the addresses 1, 2, . . . n, . . . N, the respective receiving node gives the address n−1 as the destination address.

The control signal is passed to the device 4, from the latter on to the device 5, from the latter on to the device 1 and from the device 1 to the device 2. The device 2 uses the destination address to detect that the corresponding control signal is intended for the device 2. It evaluates the control signal to determine whether an increase or a decrease in the optical power is required. The optical power is then increased or decreased accordingly.

The power that has been correspondingly changed is again detected by the receiving node 3, and if the optical power received is still not within the desired defined range, it is changed by emitting a further control signal. The optical output power of the transmitting node 2 is accordingly regulated until the optical power received at the receiving node 3 is within the desired range.

Corresponding regulating operations, for example, also take place between the further MOST devices of the ring, that is to say between the MOST device 3 and the MOST device 4, between the MOST device 4 and the MOST device 5 etc. An ideal optical power level may thus be provided on each transmission path of the MOST ring 100.

Figure 2A:
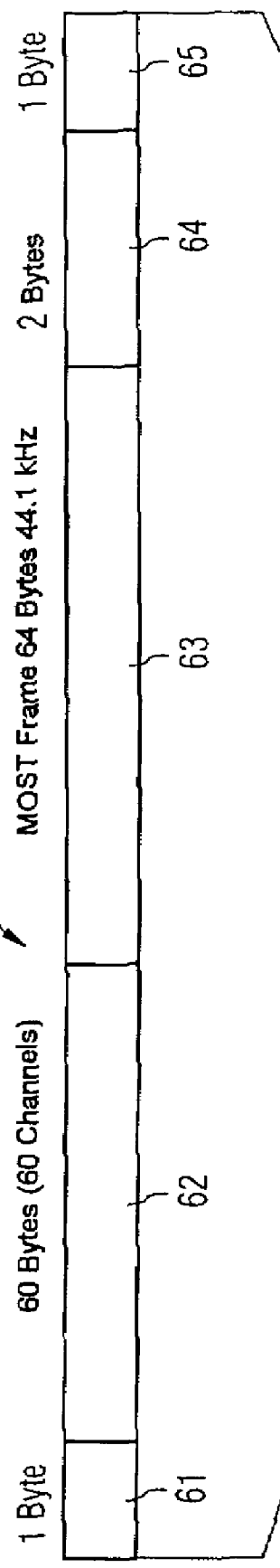
FIG. 2A is a diagram of the frame structure of a data frame that is transmitted in the MOST network of FIG. 1.
Figure 2B:
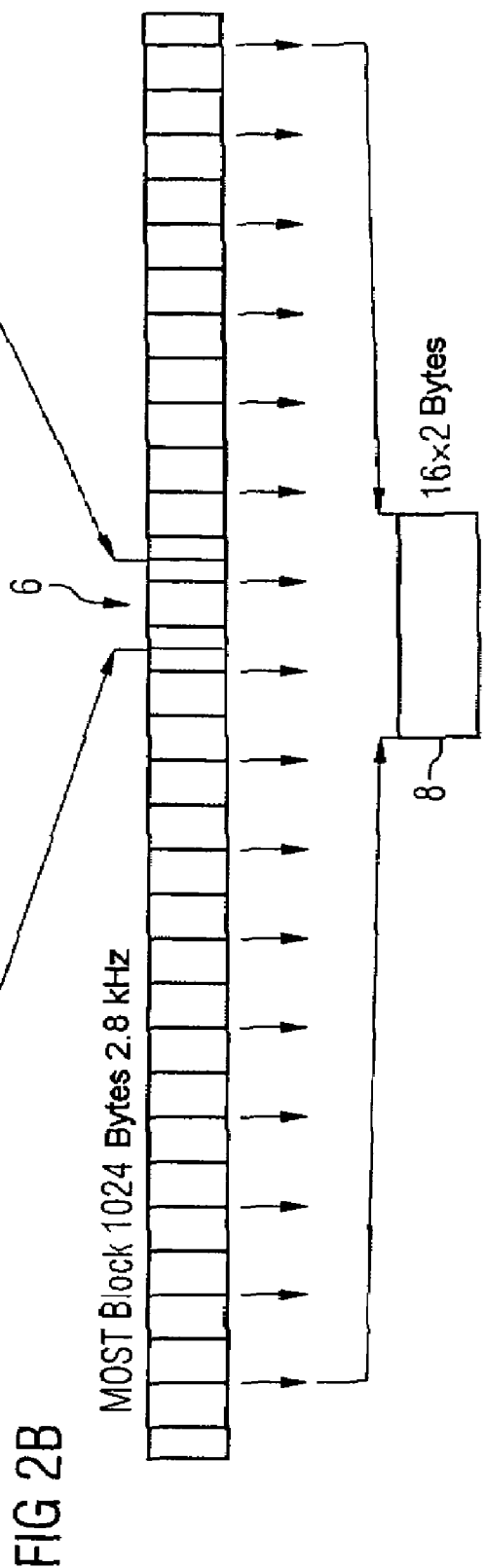
FIG. 2B is a diagram of a MOST block having 16 data frames as shown in FIG. 2A.

The generation of an exemplary control signal in the control channel of the MOST ring 100 is explained, by way of addition, with reference to exemplary FIGS. 2A, 2B, 3A, 3B. FIG. 2B shows a MOST block having a length of 1024 bytes and containing sixteen frames 6 each having a length of 128 bytes. FIG. 2A shows such a MOST frame 6. The frame 6 has a first region 61 having a length of 1 byte and containing management or administrative information. A second region 62 having a length of 60 bytes contains synchronous data for multimedia applications, for instance audio or video data. A third region 63 contains asynchronous data, for example packetized IP data for time-insensitive applications. A fourth region 64 comprises a length of 2 bytes containing control data. A fifth region has a length of 1 byte that contains CRC and parity information.

Since each frame contains 2 bytes of control data, a MOST block contains a total of 16×2=32 bytes of control data which may be regarded as block 8 below FIG. 2B. The 32 bytes of control data transmit data associated with the control channel of the MOST ring.

Figures 3A, 3B:
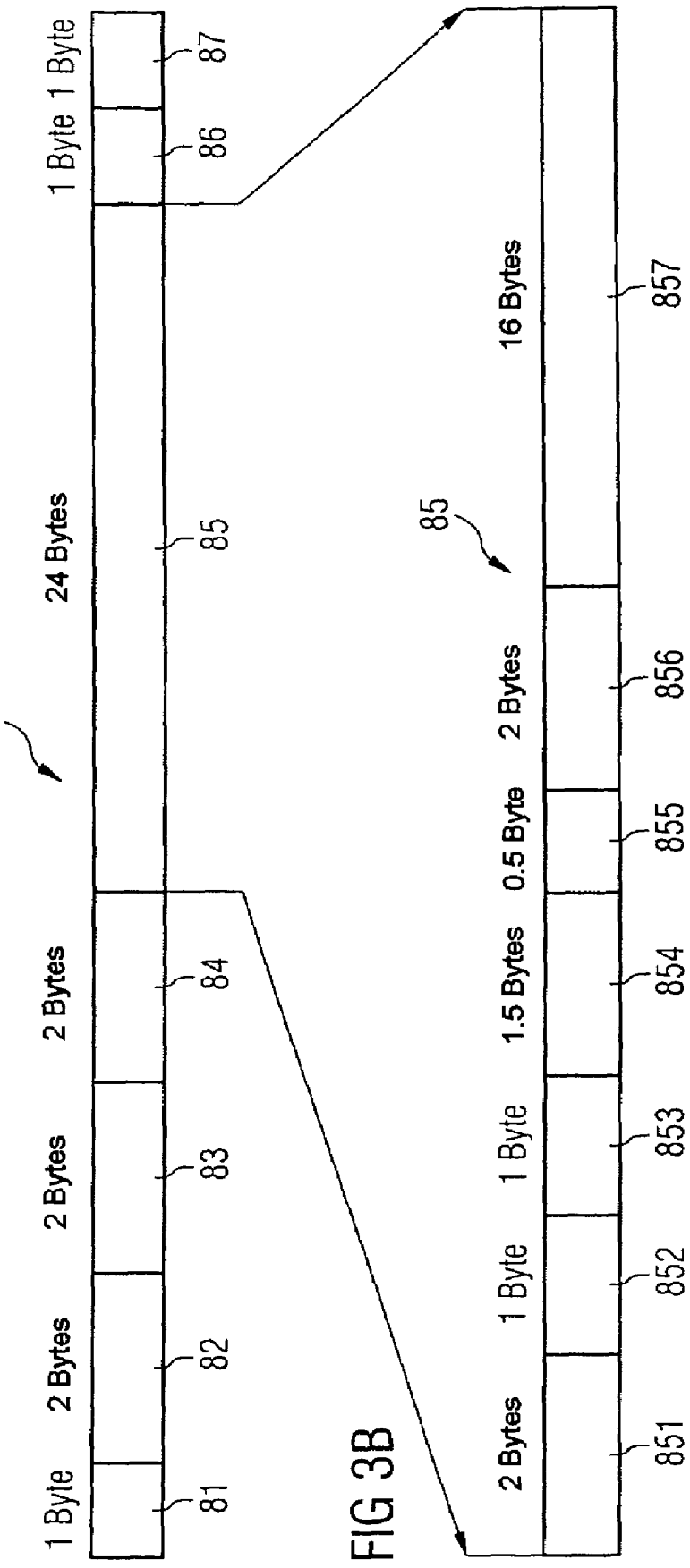
FIG. 3A is a diagram of the structure of a control message in the control channel of the MOST network.
FIG. 3B is a diagram of the structure of the message part of a control message of FIG. 2A.

FIG. 3A shows an exemplary corresponding control data frame 8 having a length of 32 bytes. A first region 81 having a length of 1 byte contains administrative information. A second region 82 having a length of 2 bytes contains the destination address. A third region 83 having a length of 2 bytes contains the source address. A fourth region 84 having a length of 2 bytes contains the message type. A fifth region (message block) 85 having a length of 24 bytes contains the actual control messages. A sixth region 86 having a length of one byte contains the CRC checksum. A seventh region 87 having a length of 1 byte contains administrative information.

FIG. 3B shows, by way of example, the subdivision of the message block 85 of FIG. 3A. Various regions 851-857 which define particular functions and parameters are again defined. In the context of the present invention, the control signal relating to an increase or decrease in the optical power of an optical transmitter, in one example, is written to the message block 85. The address "n−1" is given as the destination address in the second region 82.

The configuration of the invention is not restricted to the exemplary embodiment described. Rather, numerous alternative configurations are conceivable. By way of example, the invention may also be implemented in other topologies, for example a bus structure or a star structure. This is possible without problems since the setting of the optical power is accommodated between two adjacent network nodes, independent of the role of the network topology. A bidirectional network may also be used instead of a unidirectional network. One exemplary application of the solution according to the invention is in the automotive sector, in the field of local area networks and in home networking.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for optimizing the optical power in an optical network that has a plurality of network nodes each having a transmitter and a receiver, comprising:

generating an optical signal at a first network node;

receiving the optical signal at a second network node;

detecting the optical power of the optical signal at the second network node, wherein during a regulating operation a determination is made in a second network node whether the optical power detected is outside a defined range;

if it is determined that the optical power is outside the defined range, generating, for the first network node, a control signal for increasing or decreasing the optical power;

integrating the control signal in a predetermined region of a frame, the frame comprising at least one additional region containing synchronous data and at least one additional region containing asynchronous data;

sending the control signal within the frame to the first network node, wherein a receiver of the second network node is used to convert the optical signal at the second network node into an electrical signal;

if the optical power detected is outside of the defined range, an electronic module adds the control signal to the electrical signal;

the electrical signal is supplied to a transmitter of the second network node and converted into an optical signal for transmission to the first network node; and increasing or decreasing the optical power of the optical signal emitted at the first network node in response to the control signal until the optical power detected at the second network node is within the defined range.

2. The method of claim 1, wherein integrating the control signal in a predetermined region of a frame further comprises generating frame level error correction information and control data level error correction information.

3. The method of claim 1, wherein the control signal is transmitted to the first network node via the optical network.

4. The method of claim 3, wherein signal transmission in the optical network is subject to a transmission protocol that defines at least one user channel for transmitting the synchronous and asynchronous data and at least one control channel for transmitting control and signaling data, the control signal in the control channel being transmitted to the first network node.

5. The method of claim 1, wherein the optical power levels detected at the individual receivers of the network nodes are stored in a memory.

6. The method of claim 1, wherein a control signal is generated irrespective of whether the signals received at the second network node are intended for the second network node or are forwarded to another network node.

7. The method of claim 1, wherein detecting the optical power of the optical signal at the second network node comprises:
using a photodiode to convert the optical signal into an electrical signal; and
determining the optical power received by measuring the photodiode current.

8. The method of claim 1, wherein the optical network comprises a serial network in which optical signals are transmitted between adjacent network nodes.

9. The method of claim 1, wherein the optical network comprises a ring topology.

10. The method of claim 1, wherein the optical network comprises a unidirectional network.

11. The method of claim 1, wherein the control signal generated by the second network node contains the address of the first network node in the optical network.

12. The method of claim 11, wherein the address of that network node which precedes the second network node in a unidirectional optical network is given as the address of the first network node.

13. The method of claim 1, wherein the first network node increases or decreases the optical power by a defined amount after it has received the control signal.

14. The method of claim 1, wherein the attenuation of the individual transmission paths of the network is determined from the optical power levels instantaneously detected at the individual receivers of the network nodes.

15. The method of claim 14, wherein the attenuation of the individual transmission paths of the network is evaluated for network diagnosis.

16. An optical network that has a plurality of network nodes each having a transmitter and a receiver, wherein at least one of the network nodes comprises:
means for detecting the optical power of an optical signal that was emitted by another network node;
means for determining whether the optical power detected is outside a defined range;
means for generating, for that network node which emitted the optical signal, a control signal for increasing or decreasing the optical power if the optical power detected is outside the defined range, the means for generating configured to integrate the control signal in a predetermined region of a frame, the frame comprising at least one additional region containing synchronous data and at least one additional region containing asynchronous data; and
means for sending the control signal to that network node which emitted the optical signal; and wherein at least a further one of the network nodes has means for increasing or decreasing the optical power of the emitted optical signal as a function of the control signal for increasing or decreasing the optical power, the means for sending adding the control signal to an electrical signal, the means for sending further converting the electrical signal into an optical signal.

17. The optical network of claim 16, wherein provision is made of a central memory that stores one or more of the optical power levels detected at the individual network nodes and one or more values derived therefrom.

18. The optical network of claim 16, wherein the means for generating a control signal passes the control signal to a control channel of the optical network, the control signal being transmitted to the emitting network node via the control channel.

19. The optical network of claim 16, wherein the optical network is a serial optical network.

20. The optical network of claim 16, wherein the optical network has a ring topology.

21. The optical network of claim 16, wherein the network is a unidirectional network.

22. The optical network of claim 16, wherein the means for generating further comprises generating frame level error correction information and control data level error correction information.

23. The optical network of claim 16, wherein an address of a preceding network node in a unidirectional network is given as the network address of the emitting network node.

24. An optical network that has a plurality of network nodes each having a transmitter and a receiver, wherein at least one of the network nodes comprises:
an electronic module configured to detect the optical power of an optical signal that was emitted by another network node;
a power analyzer configured to determine whether the optical power detected is outside a defined range;
a controller configured to generate, for that network node which emitted the optical signal, a control signal for increasing or decreasing the optical power if the optical power detected is outside the defined range, the controller configured to add the control signal to the electrical signal such that the control signal is arranged in a predetermined region of a frame, the frame comprising at least one additional region containing synchronous data and at least one additional region containing asynchronous data; and
a control medium configured to send the control signal to that network node which emitted the optical signal; and wherein at least a further one of the network nodes comprises a microcontroller configured to increase or decrease the optical power of the emitted optical signal as a function of the control signal for increasing or decreasing the optical power.

25. The optical network of claim 24, wherein the controller is further configured to generate frame level error correction information and control data level error correction information.

26. The optical network of claim 24, wherein the controller is further configured to pass the control signal to a control channel of the optical network, the control signal being transmitted to the emitting network node via the control channel.

27. The optical network of claim 24, wherein the optical network comprises a serial optical network or comprises a ring topology.

28. The optical network of claim 24, wherein the network comprises a unidirectional network.

29. The optical network of claim 24, wherein the controller is further configured to add the network address of the emitting network node to the control signal.

30. The optical network of claim 29, wherein the address of the preceding network node in a unidirectional network is given as the network address of the emitting network node.

31. The optical network of claim 24, further comprising a central memory configured to store one or more of the optical power levels detected at the individual network nodes and one or more values derived therefrom.

* * * * *